May 20, 1941.  O. A. LIGHT  2,242,891
STORAGE RACK
Filed April 3, 1940  3 Sheets-Sheet 1

INVENTOR.
Oliver A. Light
BY Howard P. King
ATTORNEY.

May 20, 1941.　　　O. A. LIGHT　　　2,242,891
STORAGE RACK
Filed April 3, 1940　　　3 Sheets-Sheet 2
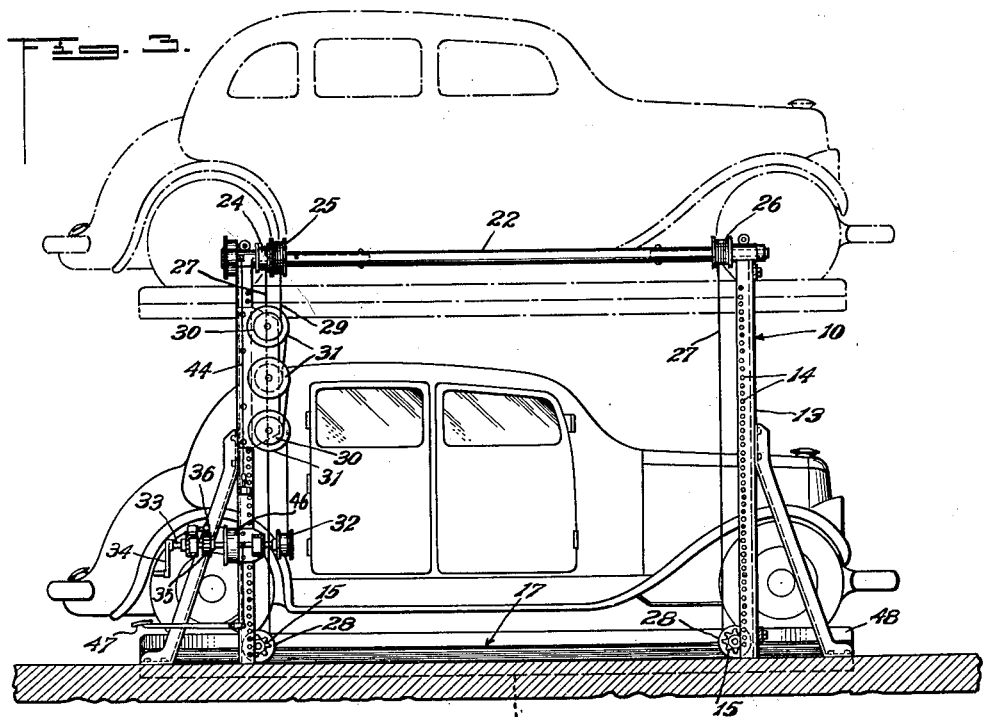
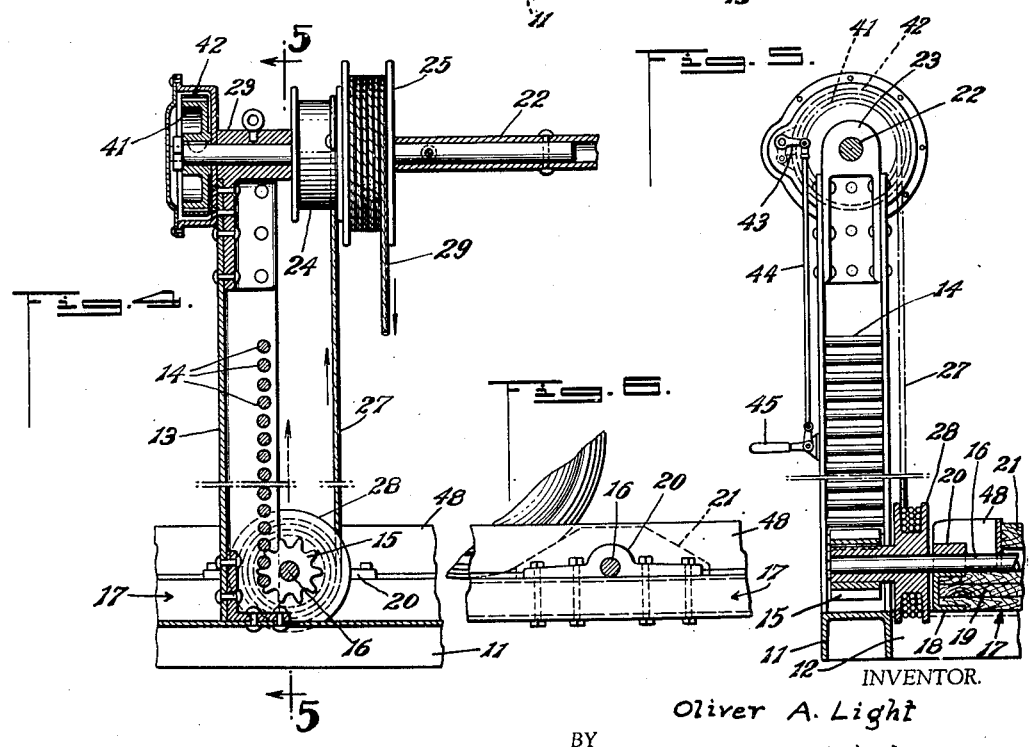
INVENTOR.
Oliver A. Light
BY Howard P. King
ATTORNEY.

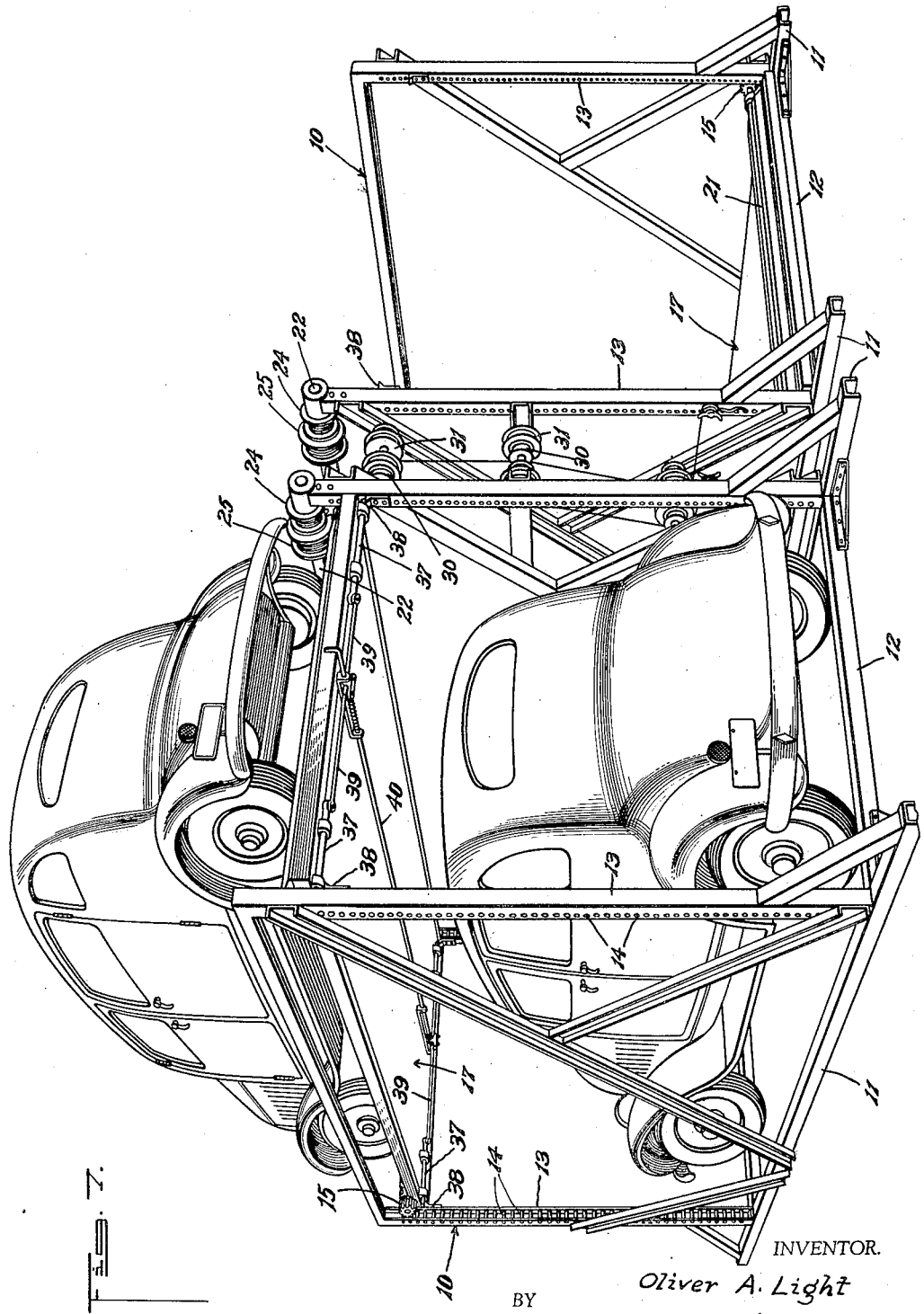

Patented May 20, 1941

2,242,891

UNITED STATES PATENT OFFICE 2,242,891

STORAGE RACK

Oliver A. Light, East Orange, N. J.

Application April 3, 1940, Serial No. 327,683

7 Claims. (Cl. 254—89)

This invention relates to storage racks, and particularly to storage racks for vehicles, and having utility in garages, parking lots and elsewhere for increasing the effective storage capacity of any given area.

The objects of the invention are to provide an improved, effective storage rack of the character stated; to enable a vehicle to be readily elevated by hand operation; to maintain the vehicle level at all times without resorting to involved or expensive mechanisms; to provide a rack which may be set up in place without any material excavation, prepared foundations, or other expensive or difficult operations; to provide a series of racks and obtain bracing of one from another; to employ cables and pulleys or other inexpensive lifting and power multiplying means; to conserve space and thereby afford maximum capacity to a given area and ease in maneuvering the vehicles into the racks; to maintain sturdiness of construction and yet employ relatively light and inexpensive structural elements; to provide a construction readily fabricated and erected; to enable the vehicle to be chocked by parts also having other functions; to apply holding means other than the elevating mechanism for holding the vehicle in raised position; to enable the vehicle to be lowered gradually and in level condition; to secure simplicity of construction and operation; and to obtain other advantages and results as may be brought out in the following description.

Referring to the accompanying drawings in which like numerals of reference indicate similar parts throughout the several views:

Figure 3 is a side elevation of one of the racks taken as a section on a vertical plane between the two racks shown in Figures 1 and 2;

Figure 4 is a detail sectional view of the elevating mechanism taken on a central plane through a corner upright;

Figure 5 is a sectional elevation on line 5—5 of Figure 4;

Figure 6 is a detail sectional elevation showing the shaft protector and chock in operation; and Figure 7 is a perspective view of a modified construction of rack.

Figure 1:
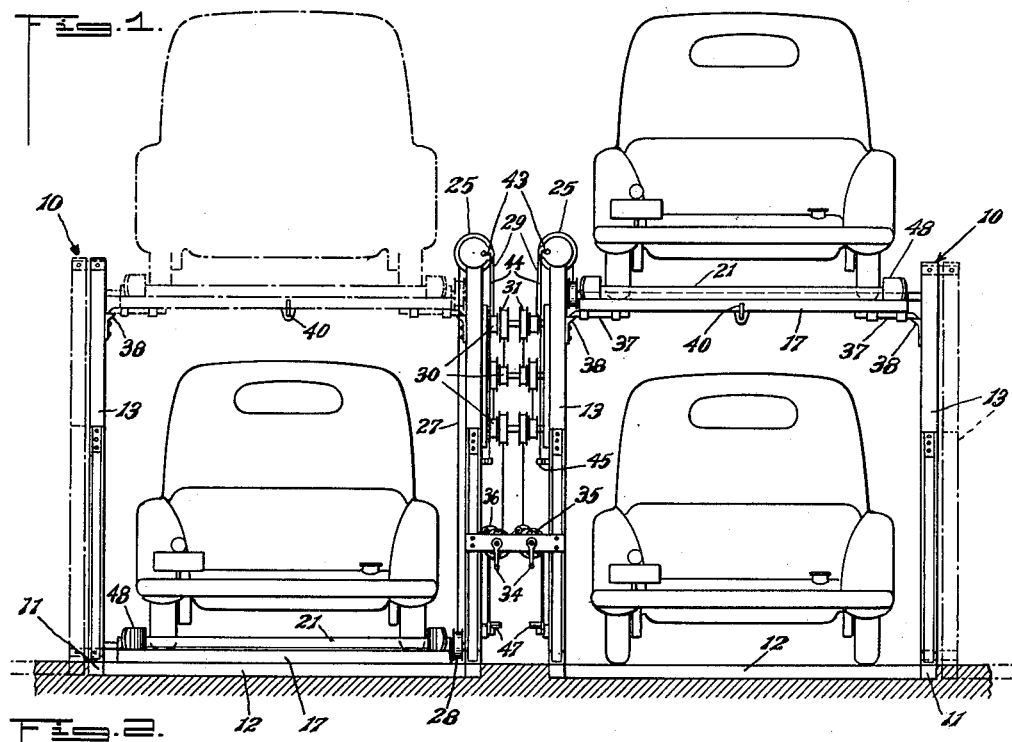
Figure 1 is an end elevation of a plurality of racks constructed in accordance with the preferred embodiment of my invention.
Figure 2:
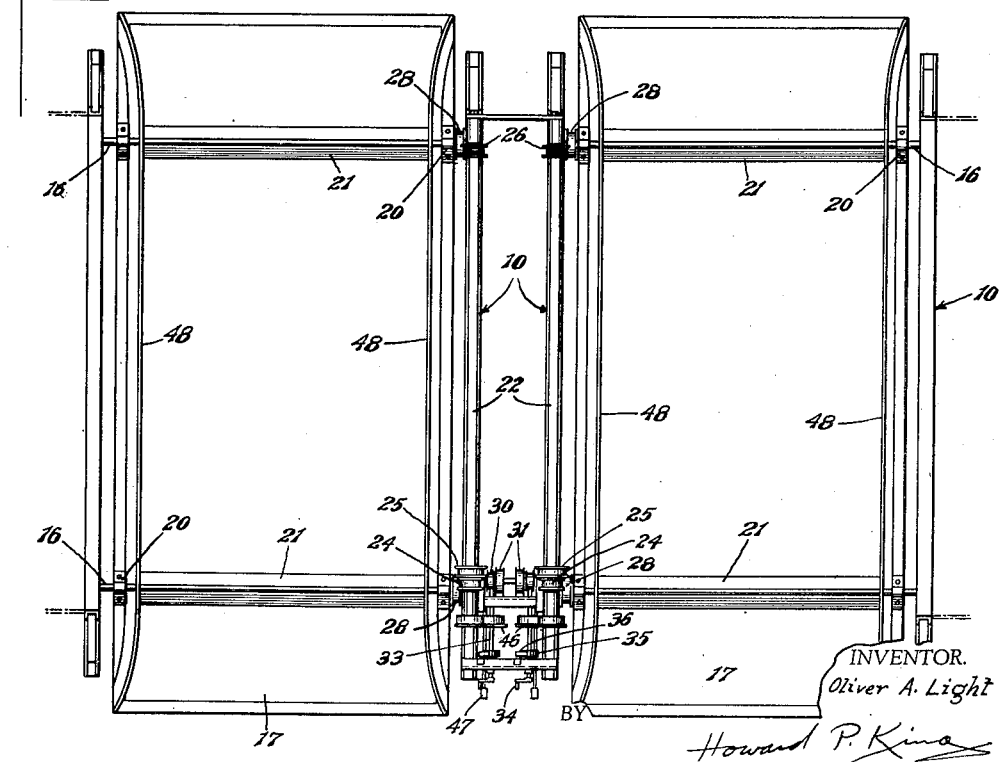
Figure 2 is a plan of the same.

In the specific embodiment of the invention illustrated in said drawings, the reference numeral 10 designates an open frame having side sills 11 and end sills 12 suitably secured together and adapted to rest upon the ground. Four corner posts or uprights 13 are erected from the junctures of the several sills, they also forming part of said open frame 10. Said uprights are vertically parallel and suitably spaced for admitting a vehicle to be driven between side pairs of uprights. Said uprights are suitably braced from each other, from the sills or from any other fixed structure. Furthermore said uprights are shown as and preferably are fabricated from channel-iron with the open sides of the several channels directed rearwardly in the case of the front pair of uprights and facing forwardly in the instance of the rear pair of uprights. Each upright is provided with a vertical series of horizontally disposed rungs 14 the ends of which are carried by the side flanges of the channel and preferably next the open side of the channel. The said rungs are quite close together, spaced just sufficiently to admit teeth therebetween projecting from a toothed wheel 15 so that, as the wheel is rotated, the engagement of its teeth with the rungs will accomplish a "walking" of the toothed wheel up and down the upright.

According to the present disclosure, the two toothed wheels next the front pair of uprights are fast upon a common shaft 16 extending crosswise of the frame for the purpose. Similarly the two toothed wheels next the back pair of uprights are fast upon another cross shaft 16. These cross shafts 16, 16 are parallel to each other and preferably are upon the upper side of a platform 17. As indicated in Figure 5 particularly, the platform may consist of a channel frame portion 18 with the channels facing inwardly and receiving the edges of a laminated wood body portion 19. Bearings 20 are secured on the channel frame for rotatably carrying the said shafts affording an underslung mounting for the platform. Protecting cleats 21 are applied to the platform over and longitudinally of the shafts, and these cleats are also arranged to form chocks for the wheels of the vehicle driven onto the platform.

At one side of open frame 10 of the rack, and extending from top to top of the two uprights 13 thereat, is a longitudinal shaft 22 carried in suitable bearings 23 attached at the top of the channels forming the uprights. Next the front bearings 23, preferably immediately to the rear of the bearing, is a cable drum 24 fast on the shaft, and behind said drum is a second but somewhat larger drum 25 also fast with respect to the shaft. At the rear end of the shaft, preferably immediately in front of the rear bearing 23, is another drum 26 corresponding in diameter to the first-mentioned drum 24 next the forward bearing. The smaller drums have cables or other flexible means 27 attached thereto adapted to be wound thereupon, said cables depending from the drums and having their lower ends attached to drums 28 fast upon the respective front and rear cross-shafts 16 and toothed wheels 15. As said cables are wound upon the upper small drums 24, 26, they unwind from the lower ones 28 and thus rotate the cross shafts 16. As indicated above, such rotation results in the toothed wheels 15 walking up the rungs 14, and since the opposite end of the cross shafts 16 each have another toothed wheel 15 thereon, the shafts 16 and the platform 17 rise in level positions at all times.

The larger drum 25 on the upper shaft has a cable or other flexible means 29 attached thereto and which is wound upon the drum when the cable 27 is unwound from the smaller upper drum 24 next to it. By use of successive coaxial interconnected small and large drums 30, 31, one of which winds while the other unwinds, suitable power increase at the expense of speed is obtained and the final cable goes to a drum 32 on a crank shaft 33 projecting horizontally forward at one side of the frame. A crank 34 is situated on the front end of the crank shaft, and also on the crank shaft is a ratchet wheel 35 engaged by a pawl 36 so the operator may wind up the cable and raise the platform with the ratchet and pawl functioning to prevent return motion.

Appropriate sustaining means are provided for retaining the platform in its raised position so as not to rely upon the pawl and ratchet for that purpose when the vehicle is left elevated. The means, best shown in Figures 1 and 7, may, for example, comprise a sliding bolt 37 next each corner upright and mounted on the underside of the platform 17 to slide toward and away from the upright 13 as desired. Next the top of the upright and on the side thereof toward said bolt, is a fixed bracket or keeper 38 to receive the bolt end, and thus obtain the desired support of the platform and vehicle. When desired to release the several bolts, all are preferably retracted simultaneously by pairs of connected toggle links 39 in turn operated or swung by a single rod 40 connecting them.

Suitable retarding means are provided for enabling the platform and vehicle to be lowered slowly and without risk of getting out of control of the operator. For this purpose, I show a brake-drum 41 situated upon and fast with respect to the upper longitudinal shaft 22, said drum being conveniently attached to the forwardly projecting end of said shaft. A contracting brake-band 42 encircles the brake drum, said brake-band having any usual mounting and contracting levers in turn operated by a projecting lever 43 which has link connection 44 to a conveniently located hand lever 45. If desired, a similar brake, indicated generally at 46, may be applied to the crank shaft and operated through link connection by a foot pedal 47. Such a brake will also function to prevent the cable drums from unwinding faster than the cable pays off. Either or both brakes may be used when lowering a vehicle, although an operator will more probably use one brake for service purposes and reserve the other for emergency use.

Longitudinal rails 48 may be used next the sides of the platform if desired, as shown in Figures 1 to 6, or may be omitted if preferred, as shown in Figure 7. Likewise, as shown in Figure 3, the frame uprights 13 and the front and back cross shafts 16 may be spaced less than the usual wheel base of a vehicle, so as to have the car span the chocks 21 and to make the platform as short as possible and thus leave maximum maneuvering space in front of the rack. However, if preferred, the shafts 16, as shown in Figure 7, may be spaced apart a distance in excess of the wheel base of the car and thus chock the wheels in front and back of the front and back wheels respectively. In this showing, the front uprights 13 are spaced from the rear uprights 13 a distance substantially equal to the length of the platform 17, whereas in Figure 3 the platform 17 projects substantial distances at front and rear beyond the uprights.

Obviously other detail changes and modifications may be made in the construction, installation and use of my improved storage rack, and I do not wish to be understood as limiting myself to the precise fabrication, or other specific disclosures herein made except as set forth in the following claims when construed in the light of the prior art.

I claim:

1. A storage rack comprising an open frame having corner uprights, rotatably mounted toothed wheels, a pair of parallel shafts carrying pairs of said toothed wheels, cable actuated drums, one on each said shaft, for rotating the said shaft and toothed wheels and causing the same to simultaneously walk up the uprights, a third shaft above and crossing the first two said shafts and having drums over said two shafts for actuating the cables therefrom simultaneously, and power increasing drums and cables for actuating the third shaft by hand operation.

2. A storage rack comprising an open frame having corner uprights, a platform horizontally situated between the corner uprights and movable vertically therebetween, toothed wheels adjacent corners of said platform and next each said upright in engagement therewith, shafts connecting said toothed wheels in pairs, a third shaft for operating both the first mentioned shafts and all toothed wheels simultaneously for causing the toothed wheels to walk up the uprights in unison, a crank shaft and drum and cable connection therefrom to the third shaft, and a brake on said crank shaft for retarding the same as the platform is lowered.

3. A storage rack comprising an open frame having corner uprights, rotary means next each upright adapted to walk up the same as rotated, power applying means at a fixed distance from and relatively near the bottom of said frame, and means acting on the rotary means in a lifting direction with a lifting and rotating pull for simultaneously and equally rotating said rotary means from said power applying means whereby the rotary means is actuated upwardly both by virtue of said lifting pull and by rotation thereof.

4. A storage rack comprising an open frame having corner uprights, rotatably mounted toothed wheels next each upright adapted to walk up the same as rotated, power applying means at a fixed distance from and relatively near the bottom of said frame, and means acting on the rotatably mounted toothed wheels in a lifting direction with a lifting pull for simultaneously and equally rotating said toothed wheels from said power applying means whereby the said toothed wheels are actuated upwardly both by virtue of the said lifting pull and by rotation thereof.

5. A storage rack comprising an open frame having corner uprights, rotary means next each upright adapted to walk up the same as rotated, a shaft for each pair of rotary means, each shaft having a cable-actuated drum connected thereto for rotating the same and causing the rotary means to walk up the upright, and power applying means at a fixed distance from and relatively near the bottom of said frame, said power applying means having operative connection with said shafts and comprising a cable extending downwardly to each of the drums on said shafts by which said power applying means transmits a lifting pull in a lifting direction as well as a rotary actuation to both of said drums.

6. A storage rack comprising an open frame having corner uprights, a platform horizontally situated between the corner uprights and movable therebetween, rotatably mounted toothed wheels adjacent corners of said platform and next each said upright in engagement therewith and adapted to walk up the same as rotated, power applying means at a fixed distance from and relatively near the bottom of said frame, and means acting on the rotary means in a direction tending to lift the same and to lift the platform with a lifting pull as well as tending to rotate said toothed wheels for simultaneously and equally rotating said toothed wheels from said power applying means by a lifting pull from above.

7. A storage rack comprising an open frame having corner uprights, a shaft extending horizontally next the top of a pair of side uprights, a pair of drums of equal size on the said shaft next the said uprights supporting the shafts, a liftable platform between the uprights, cables depending from the said drums to the said platform and having lifting connection therewith, a third but larger drum on the said shaft, said third drum having a cable thereon which unwinds therefrom as the cables on the first two mentioned drums wind up, power applying means at a fixed distance from and relatively near the bottom of said frame, and power increasing drums and cables for actuating the said third drum from the said power actuating means.

OLIVER A. LIGHT.